Jan. 5, 1926.

P. E. BAGGE 1,568,310

HOLDING DEVICE FOR ROPES, CABLES, AND THE LIKE

Filed Nov. 8, 1924

Peter E. Bagge INVENTOR.

BY

Merrill M. Blackburn.
ATTORNEY.

Patented Jan. 5, 1926.

1,568,310

UNITED STATES PATENT OFFICE.

PETER E. BAGGE, OF MOLINE, ILLINOIS.

HOLDING DEVICE FOR ROPES, CABLES, AND THE LIKE.

Application filed November 8, 1924. Serial No. 748,710.

*To all whom it may concern:*

Be it known that I, PETER E. BAGGE, a citizen of the United States, residing at Moline, Illinois, have invented certain new and useful Improvements in Holding Devices for Ropes, Cables, and the like, of which the following is a specification.

My invention relates to means for use in connection with ropes, cables and the like, which will do away with the necessity of tying a knot in the same when it is desired to fasten the rope or the like to an object. Among the objects of my invention are to provide a holding device for use in connection with lines, ropes, cables and the like, which will render it unnecessary to tie knots therein when it is desired to fasten the same to an object and yet have it easily removable therefrom; to provide a holding device of the character stated by means of which a fastening is made more easily than by tying; to provide a structure of the character stated having a gripping power equal to the strength of the rope or the like; to produce a structure which can be manufactured substantially entirely from what would otherwise be waste material; to produce a structure which will be economical to manufacture, cheap in construction, and easily attached and detached; and such further objects, advantages and capabilities as will later more fully appear and as are inherent in the invention disclosed.

Figure 1:
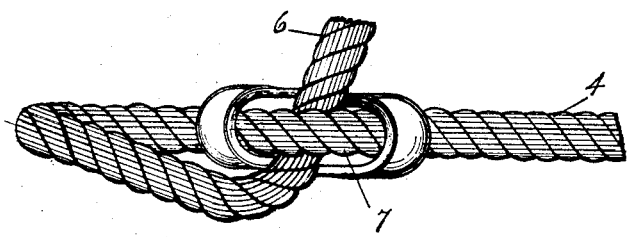
Figure 2:
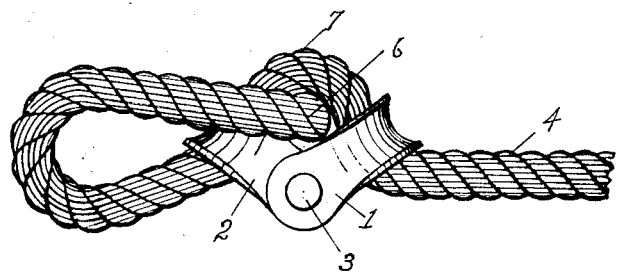
Figure 3:
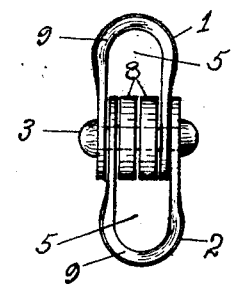

In the drawing attached hereto, and forming a part hereof, Figure 1 shows a plan view of my new construction applied to a rope; Figure 2 shows a view at right angles to that shown in Figure 1; Figure 3 shows a plan view of my new device entirely detached from any rope or the like.

Referring more in detail to the drawing, numerals 1 and 2 denote a pair of clevis-like members internally open at one end and each having its opposite end perforated for the passage of a pivot member 3. Through the internally open portions 5 a rope, cable, or the like, 4 is passed as shown most clearly in Figure 2. When it is desired to fasten this rope, or the like, to any object, the end 6 is brought back and inserted between the bend 7 of the rope and the pivoted members 1 and 2. When the rope is pulled upon the bend 7 is tightened upon the end 6 and prevents the same slipping out from between the rope and pivoted members. In actual tests, it has been found that the gripping strength of the device is as great as the rope itself. As a matter of fact the rope has been found to break elsewhere than where the fastening device was.

The pivot member 3 is shown as being riveted at both ends, but it will be understood that this is not necessary since a nut and bolt may be used for this instead of a rivet. Also, a nutless bolt provided with a cotter-pin hole could be used and a cotter-pin take the place of a nut. It is also found desirable to use one or more washers 8, of substantially the same diameter as the width of the ends through which the rivet 3 passes, in order that the end 6 of the rope may be prevented from coming in contact with more or less sharp edges of the U-shaped members 1 and 2. It will, of course, be understood that these clevis-like members could be made with one end thickened sufficiently so that when the two are assembled it would be as if one of the washers 8, were integral with one of the ends of the U members. Also, the two members could be made differently so that both arms of one member would go between the arms of the other member but such construction is not considered as good as that shown for various reasons, one of them being that in assembling the parts it would be necessary to pick two unlike members to be assembled and put a rivet through them. With a construction such as that shown the two members being entirely alike, it is only necessary to pick up two members, assemble them in the relative position shown, place two washers, between the arms, insert a rivet 3 and then rivet the end of said rivet so that the clevis-like members will be permanently held together.

This construction is made from what is normally waste stock in the manufacture of other articles, the thickness being whatever the stock thickness happens to be, customarily being about 1/8" or 1/4". This stock, at the beginning of the process of manufacture, is flat and then has its ends perforated for the reception of the rivet 3 and has its central portion pressed so that the inner face is rounded as shown at 9 to prevent any sharp edge from coming in contact with the rope when drawn through the clevis-like members. The end 6 of the rope may be inserted under the bend 7 from either side, but it is considered preferable to arrange the parts in the manner shown in the drawing.

While I have referred herein to the clevis-like members as being made of flat material, it will be understood that round or other shaped stock can be used, the same preferably having its ends flattened so that the pivot pin holes may more readily be made therein. This form of stock would have its rope engaging faces rounded and would not need to be operated upon to produce such rounded surface. Attention should be also called to the fact that, in order to be effective with small ropes, the clevis-like members should be made in small sizes which will function more effectively with such ropes. As a matter of actual practice, only 3 or 4 sizes of ropes will function properly with one size of clevis.

The structure is especially useful as a tow-line hitch, though it is not limited in its utility to this purpose, and it is, of course, understood that the specific description of structure set forth above may be departed from without departing from the spirit of my invention as set forth in this specification and the appended claims.

Having now described my invention, I claim:

1. In a holding device for lines, cables, and the like, a pair of concave clevises, and a pivot member passing through both arms of said clevises and adapted to hold them in assembled relation.

2. In a holding device for lines, cables, and the like, a pair of clevises, each having its inner face rounded to be convex in cross-section, a pivot member passing through both arms of said clevises and adapted to hold them in assembled relation, and means surrounding the pivot member substantially filling the space between the inner arms of said pair of members.

3. In a line or cable gripping device, a pair of clevises, each perforated at its two ends and having a pivot member passing through the perforations to pivotally connect the clevises, the bowed portions of said clevises being rounded on their inner faces to avoid presenting sharp edges to the held member.

4. In a holding device for lines, cables, and the like, a pair of clevises, each perforated adjacent both terminals, and a pivot member pivotally connecting said clevises and adapted to hold them in assembled relation, in combination with a substantially circular washer surrounding the pivot member to assist in holding a flexible member and to prevent cutting thereof by the clevises.

5. A pair of members each internally open at one end to receive a flexible pulling element, each member perforated at its opposite end for the reception of a pivot member and a pivot member passed through the perforations and pivotally connecting the said pair of members, in combination with a flexible pulling element threaded through the openings and adapted to have an end brought back and inserted between said pulling element and the pivoted members.

6. A pair of members each internally open at one end to receive a flexible pulling element, each member perforated at its opposite end for the reception of a pivot member and a pivot member passed through the perforations and pivotally connecting the said pair of members, the inner faces of said pair of members to be in contact with the flexible pulling element being rounded to avoid presenting sharp edges to said pulling element, in combination with a flexible pulling element threaded through the openings and adapted to have an end brought back and inserted between said pulling element and the pivoted members.

7. In a structure of the character indicated, a pair of looped members pivotally connected together, having a spacing member surrounding the pivot, and adapted to have a flexible member passed through the loops without being pinched between the loops and the spacing member.

8. In a holding member, a pair of clevises having perforated ends, a pivot member passed through the perforations and a non-angular washer surrounding the pivot, said structure being adapted to have a flexible member passed through the loops and held thereby without that part of the flexible member passing through the loops and located between them being in contact with the washer.

In witness whereof, I hereunto subscribe my name to this specification.

PETER E. BAGGE.